(12) United States Patent
Oroskar et al.

(10) Patent No.: US 8,160,619 B1
(45) Date of Patent: Apr. 17, 2012

(54) DYNAMIC PAGING CONCATENATION BASED ON PAGE-TYPE

(75) Inventors: Siddharth S Oroskar, Overland Park, KS (US); Sachin R Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 98 days.

(21) Appl. No.: 12/786,174

(22) Filed: May 24, 2010

(51) Int. Cl.
H04W 68/00 (2009.01)
(52) U.S. Cl. ......... 455/458; 455/70; 370/352; 370/389
(58) Field of Classification Search ........... 455/458, 455/70; 370/352, 389, 410
See application file for complete search history.

(56) References Cited

U.S. PATENT DOCUMENTS

| | | | |
|---|---|---|---|
| 4,885,577 A * | 12/1989 | Nelson | 340/7.31 |
| 5,369,681 A | 11/1994 | Boudreau et al. | |
| 5,726,640 A * | 3/1998 | Jones et al. | 340/7.3 |
| 6,181,945 B1 | 1/2001 | Lee | |
| 6,745,039 B1 | 6/2004 | Di Lalla | |
| 7,366,526 B2 | 4/2008 | Zhang et al. | |
| 2008/0032713 A1 | 2/2008 | Yang | |
| 2008/0096520 A1 | 4/2008 | Benco et al. | |
| 2008/0293437 A1 | 11/2008 | Ranganathan et al. | |

OTHER PUBLICATIONS

Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Cai et al., "Mitigating DoS Attacks on the Paging Channel by Efficient Encoding in Page Messages," Computer Science Department.
Unpublished U.S. Appl. No. 12/776,287, filed May 7, 2010 entitled "Dynamic Paging for Hybrid Mobile Stations".
Unpublished U.S. Appl. No. 12/786,184, filed May 24, 2010 entitled "Dynamic Adjustment of Paging Power Based Page-Type".

* cited by examiner

Primary Examiner — Phuoc Doan (57) ABSTRACT

Exemplary methods and systems for paging a mobile station are disclosed herein. An exemplary method involves: (i) before transmission of a page to a mobile station by an access network, the access network (a) determining a page-type of the page to the mobile station; (b) based at least in part on the page-type, determining whether to disable or enable page-concatenation for the page; and (c) if concatenation is enabled, then concatenating the page, and otherwise refraining from concatenating the page; and (ii) the access network transmitting the page to the mobile station. In an exemplary embodiment, determining the page-type of the page may involve determining whether the page is a voice-service page or a data-service page and/or determining whether or not the page is an intersystem page. Further, concatenation may be enabled if the page is a voice-service page, and disabled if the page is a data-service page. Yet further, concatenation may be disabled if the page is an intersystem page (preferably regardless of whether the intersystem page is a voice-service or data-service page).

22 Claims, 7 Drawing Sheets

DYNAMIC PAGING CONCATENATION BASED ON PAGE-TYPE

BACKGROUND

In a typical cellular wireless communication system, an area is divided geographically into a number of cell sites, each defined by a radio frequency (RF) radiation pattern from a respective base station. The base stations of the cells are then coupled to a switch or gateway (hereafter "switching system") that provides connectivity with a transport network and/or to a signaling network. When a mobile station (i.e., wireless communication device), such as a cellular telephone, personal digital assistant, pager, or appropriately equipped portable computer, for instance, is positioned in a cell, the mobile station may then communicate via an RF air interface with the base station of the cell. Consequently, a communication path can be established between the mobile station and the network, via the air interface, the base station and the switching system. In this way, the base station(s) and switching system work in combination to function as a radio access network (RAN), providing mobile stations with RF access to engage in network communications, such as telephone calls or Internet communications.

In general, the air interface used for communications from a base station to mobile stations (i.e., the forward link) may be divided into a number of channels, including traffic channels used to carry bearer traffic (e.g., voice or other user data) and control channels used to carry overhead messages. Depending on the wireless technology used, the air interface can be divided into these channels through code division multiplexing (with each channel defined by modulation with a specific code), time division multiplexing (with each channel defined as a segment of time), frequency division multiplexing (with each channel defined by modulation with a specific frequency), and/or some other mechanism.

When a RAN receives a request to connect a call to a mobile station (which may be for various different types of communications, such as voice communications or data communications), the RAN will typically page the mobile station in an effort to determine whether the mobile station is available to receive the call. In practice, for instance, the switching system may direct the serving base station to broadcast over an air-interface paging channel, a general page message directed to the mobile station. If the mobile station receives the page message, the mobile station would then respond with an acknowledgment message back to the RAN, which would cause the switching system to continue setup of the call to the mobile station. On the other hand, if the RAN does not receive an acknowledgement from the mobile station within a set period of time, the RAN may then re-page the mobile station. Further, the RAN may repeat the re-paging process a set number of times or until the RAN receives an acknowledgement from the mobile station. Ultimately, if the RAN does not receive any page-acknowledgement from the mobile station, the RAN may programmatically conclude that the call setup paging process failed.

If a base station has numerous page messages to send, then the paging channel can become congested, which may delay call setup or even result in a page not reaching the intended mobile station. Accordingly, in a further aspect of existing CDMA access networks, base station commonly group a certain number of pages (that are typically intended for different mobile stations) into a common page message for transmission via the paging channel. Furthermore, to conserve bandwidth, and so that more pages can be transmitted per timeslot, each page in a page message may be concatenated.

Furthermore, since mobile stations register with a RAN from time-to-time, it is possible that when a RAN pages a mobile station, the mobile station may have traveled out of the coverage area in which it last registered. As such, existing RANs may be configured for "intersystem" paging in order to page an access terminal that is no longer located in its last-registered coverage area. In particular, a RAN may be configured to send a page to a mobile station in its registered coverage area, which is served by a given switching system, as well as to send an "intersystem" page in a nearby coverage area that is served by another switching system. Thus, in the event the mobile station has moved into the coverage area served by the other switching system, the intersystem page should reach the mobile station.

Overview

In practice, it has been observed that the paging success rate (PSR) (i.e., the percentage of pages that successfully reach the intended mobile station) may vary between different types of pages. For example, it has been observed that the success rate of voice pages (i.e., pages indicating an incoming voice communication for a mobile station) is typically higher than the success rate for data pages (i.e., pages indicating an incoming data communication for a mobile station). This is due, at least in part, to the fact that pages for voice services may be given priority over pages for data services, and as such a data page may be shed in favor of a voice page at times when the paging channel is highly congested.

Furthermore, it been observed that the PSR is typically lower for intersystem pages, than for pages sent by a switching system serving the coverage area in which a mobile station is registered. Specifically, because intersystem pages are typically sent to mobiles located in a border zone between switching systems, the mobile stations may "ping-pong" between systems (i.e., repeatedly switch back and forth between the systems). In this scenario, there is a greater probability that a mobile station will disconnect from a system before it receives a page, which in turn may decrease the PSR for intersystem pages.

Accordingly, methods and systems are provided herein to dynamically adjust the amount of concatenation applied to pages in order to help improve the PSR for certain types of pages (typically those types that have been observed to have a lower PSR). For instance, in an exemplary embodiment concatenation may be disabled or reduced for data pages and/or intersystem pages so as to help increase the PSR for such pages. Since some information is inevitably lost through concatenation of a page and furthermore, some mobile stations may not be configured to receive pages in concatenated form, the probability of a mobile station receiving a page (i.e., PSR) may decrease due to concatenation of the page. Therefore, by dynamically enabling/disabling concatenation, an exemplary embodiment may help to increase the PSR for page-types that typically have a lower PSR, such as data-service pages and/or intersystem pages.

In one aspect, an exemplary method for paging a mobile station involves: (i) before transmission of a page to a mobile station by an access network, the access network (a) determining a page-type of the page to the mobile station; (b) based at least in part on the page-type, determining whether to disable or enable page-concatenation for the page; and (c) if concatenation is enabled, then concatenating the page, and otherwise refraining from concatenating the page; and (ii) the access network transmitting the page to the mobile station.

In an exemplary embodiment, determining the page-type of the page may involve determining whether the page is a voice-service page or a data-service page and/or determining whether or not the page is an intersystem page. Further, concatenation may be enabled if the page is a voice-service page, and disabled if the page is a data-service page. Additionally or alternatively, concatenation may be disabled if the page is an intersystem page (preferably regardless of whether the intersystem page is a voice-service or data-service page).

In another aspect, an exemplary system is disclosed that includes a tangible computer readable medium and program instructions stored on the tangible computer readable medium. The program instructions are executable by at least one processor to: (i) before transmission of a page to a mobile station by an access network (a) determine a page-type of the page to the mobile station; (b) based at least in part on the page-type, determine whether to disable or enable page-concatenation for the page; and (c) if concatenation is enabled, then cause the access network to concatenate the page, and otherwise cause the access network to refrain from concatenating the page; and (ii) cause the access network to transmit the page to the mobile station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Exemplary methods and systems may dynamically vary the degree to which a page is concatenated, based upon the "page-type" of the page. This may be help to improve the paging success rate (PSR) for page-types having a lower PSR; for instance, by decreasing or disabling concatenation of such pages. It should be understood that other benefits are also possible, and that any benefit provided or potentially provided by an exemplary embodiment should not be construed as limiting the invention.

Figure 1:
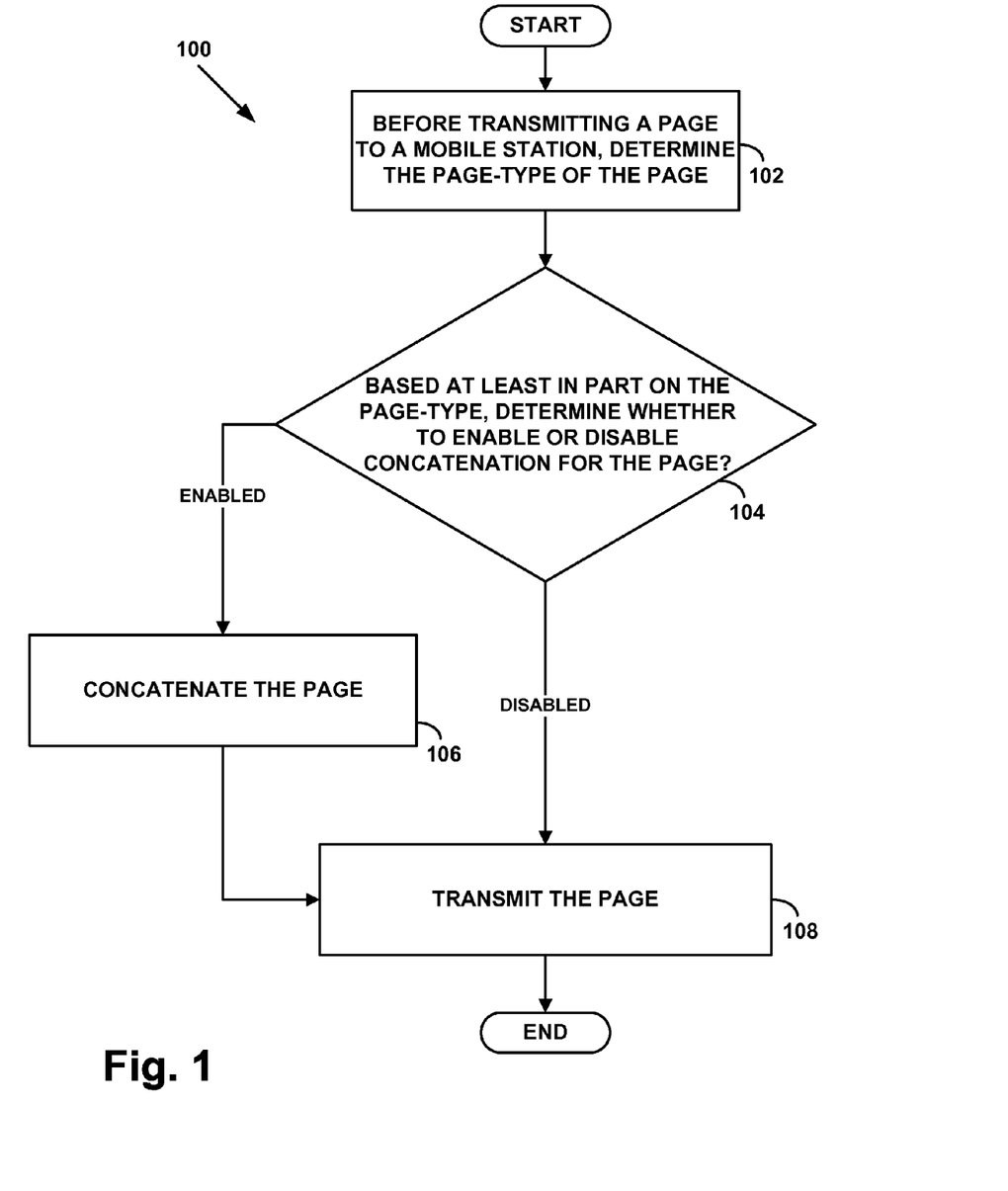
FIG. 1 is a flow chart illustrating a method for paging a mobile station, according to an exemplary embodiment.

FIG. 1 is a flow chart illustrating a method 100 for paging a mobile station, according to an exemplary embodiment. As shown, method 100 involves an access network, before transmission of a page to a mobile station, determining the page-type of the page, as shown by block 102. Based at least in part on the page-type, the access network then determines whether to disable or enable page-concatenation for the page, as shown by block 104. If concatenation is enabled, the access network concatenates the page, as shown by block 106. Then, after enabling or disabling concatenation as appropriate (and concatenating the page if concatenation is enabled), the access network transmits the page, as shown by block 108.

As used herein, the "page-type" of a page may be defined in a number of different ways. In some embodiments, the page-type may be a function of the type of service (i.e., the type of communication) for which a mobile station is being paged. For example, a page may be for a voice service (i.e., for a voice call other than a voice-over-IP (VOIP) call), a data service (i.e., e-mail, web browsing, Internet-based applications, VOIP, etc.), or possibly for some other type of service. More specifically, in IS-95 and IS-2000 systems, where Service Options (SOs) identify different types of pages, the Service Option of a page may be used to classify a page as either a voice-service page or a data-service page.

As such, a base station may be configured to identify the page-type of a page as, for example, a "voice-service" page or a "data-service" page, and to adjust the page-transmission power accordingly. In other embodiments, the page-type may be a function of whether or not the page is an "intersystem" page (i.e.; whether the page is being sent by an MSC to which the serving MSC has forwarded the page). And in other embodiments, the page-type may be a function of both the type of service (i.e., the type of communication) for which the mobile station is being paged and whether or not the page is an intersystem page. For example, the base station may dynamically adjust the page-transmission power based upon whether a given page is (a) an intersystem voice-service page, (b) a non-intersystem voice-service page, (c) an intersystem data-service page, or (d) a non-intersystem data-service page. Other examples are also possible.

It is important to note that pages notifying a mobile station of an incoming text message, such as a short message service (SMS) or a multimedia messaging service (MMS) message (which, for simplicity, may both be referred to herein as "SMS-service pages" or "SMS pages"), may be treated as a data-service page, treated as a voice-service page, or treated as a distinct type of page unto themselves. More specifically, SMS pages technically notify the recipient mobile station of a data communication, and thus may be treated as data-service pages. However, because an SMS center (SMSC) stores the message, and will repeatedly re-initiate a page via a network switch, in the event that previous attempts to send an SMS page to a mobile station have failed, the PSR for SMS messages may be higher than for other types of data communications, and therefore SMS pages may also be treated as voice-service pages, as the PSR also tends to be higher for voice-service pages as compared to data-service pages. Further, as the PSR for SMS pages may be higher than even the PSR for voice-service pages, SMS pages may be treated as a separate type of page altogether.

Accordingly, an exemplary method may also involve a base station may dynamically adjust the page-transmission power based upon whether a given page is a voice-service page, a data-service page, or an SMS page (and possibly further distinguishing between intersystem and non-intersystem pages for one or more of these types of services). It should be understood that these various treatments of SMS pages are within the scope of the invention, and that generally, the manner in which SMS pages are treated is a matter of engineering design choice.

Figure 2:
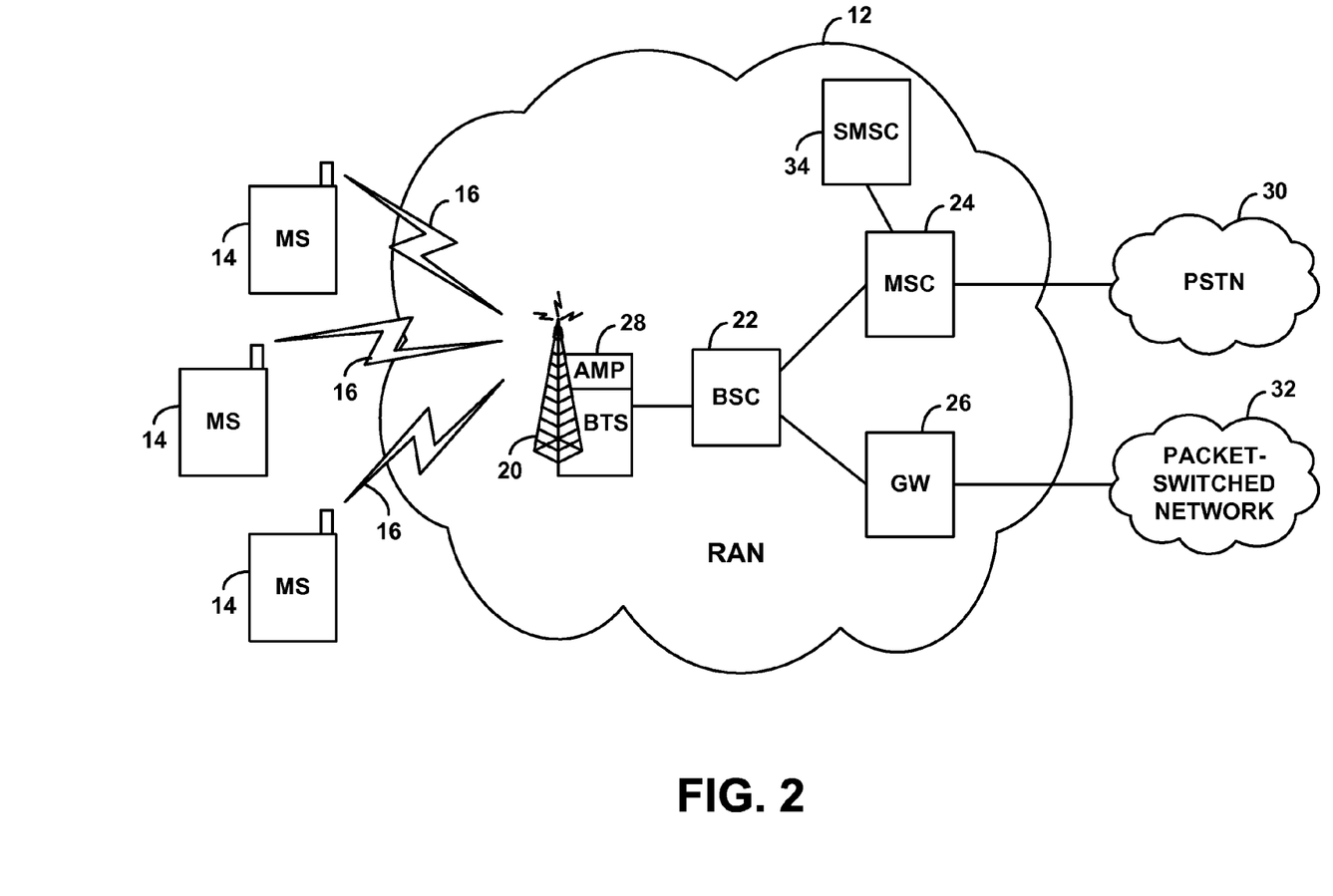
FIG. 2 is a simplified block diagram depicting a communication system in which an exemplary embodiment can be implemented.

FIG. 2 is a simplified block diagram depicting a communication system in which an exemplary embodiment of the invention can be implemented. The system of FIG. 2 includes at its core a radio access network (RAN) 12 that is arranged to serve one or more mobile stations 14 via one or more air interfaces 16 (or multiple air interfaces 16). Generally, RAN 12 may be any wireless serving network that is capable of communicating over an air interface with one or more mobile stations, such as a mobile station 14 for instance, and particularly such a network that is capable of paging mobile stations. The system, including RAN 12, and mobile stations 14, may operate according to any wireless communication protocol now known or later developed, examples of which include without limitation CDMA (e.g., CDMA2000, EV-DO), iDEN, TDMA, AMPS, GSM, GPRS, UMTS, EDGE, WiMAX (e.g., IEEE 802.16), LTE, microwave, millimeter wave, satellite, MMDS, Wi-Fi (e.g., IEEE 802.11), Bluetooth, and infrared.

By way of example, RAN 12 may be configured to provide Code Division Multiple Access (CDMA) service under industry standard IS-2000, in which the forward link may define up to 64 channels, each distinguished by a unique "Walsh code." The control channels include a pilot channel defined by Walsh code 0, a synch channel defined by Walsh code 32, and a number of paging channels defined by Walsh codes 1 through 7, as necessary. The traffic channels, in turn, are defined by the remaining Walsh codes (up to 62 in total). Further, in a CDMA system, each sector of a base station cell is distinguished by a PN offset, which defines a sector-specific part of a pseudo-random number. Communications between a base station and a mobile station on a given channel, in a given sector, and on a given carrier frequency, are encoded using the Walsh code of the channel and the PN offset of the sector and are then carried on the carrier frequency. A mobile station receiving such a communication can then extract particular channels from the air interface by employing a "rake receiver" that scans through air interface signals in search of signals that are encoded with particular combinations of PN offset and Walsh code.

Additionally or alternatively, RAN 12 may operate according to the well-known EV-DO protocol (as defined by industry standard IS-856 for instance), in which the forward link is divided into timeslots of 1.67 ms each, and each timeslot is further time division multiplexed to define various channels including a data channel and a control channel. The data channel is used to carry bearer data to a mobile station, and the control channel is used to carry control messages such as page messages for instance. In addition, as with legacy CDMA systems, each cell sector defined under IS-856 may have a respective PN offset and may operate on a particular carrier frequency, and so forward link communications may be encoded using the PN offset, modulated on the carrier frequency, and carried in a particular timeslot. Numerous other air interface protocols are known as well or will be developed in the future.

Generally speaking, mobile stations 14 may be any wireless communication devices that are capable of wirelessly communicating with RAN 12 and, in particular, any wireless communication devices that are capable of being paged by RAN 12 and of operating at one or more paging slot frequencies. Examples of such mobile stations 14 include cellular telephones, wirelessly-equipped PDAs, wirelessly equipped personal computers, and wirelessly equipped appliances or devices of other sorts, now known or later developed. As is well understood in the art, the term "mobile station" designates any such wireless communication device, regardless of whether the device is currently or permanently situated in a fixed position (e.g., attached to a wall or desk), and regardless of whether the device is easily movable (e.g., handheld or pocket-sized) or battery-operated. Wireless communication devices are considered to be "mobile stations" because they can usually be operated at various locations within the coverage of a serving RAN.

Without limitation, FIG. 2 depicts an example configuration of RAN 12. As shown, the example configuration includes a base station 20, a base station controller (BSC) 22, a mobile switching center (MSC) 24, and a packet data gateway (GW) 26. Each of the components of RAN 12, including base station 20, BSC 22, MSC 24 and GW 26, preferably includes a processor (one or more processors), data storage, and program instructions stored in the data storage and executable by the processor to carry out various functions described herein. Alternatively or additionally, these or other RAN components may include other forms of logic, such as firmware and/or hardware logic, to carry out various functions described.

Base station 20 may include an antenna tower (or other antenna structure) and associated equipment, including a programmable processor for instance, arranged to communicate over air interface 16 with one or more served mobile stations 14. The base station antenna and associated equipment may be arranged to define a cell and various cell sectors in which mobile stations can operate. Further, the base station 20 preferably includes, possibly for each sector, a power amplifier 28 such as a tower-top amplifier for instance, which is arranged to amplify RF signals for transmission over air interface 16 to mobile stations. The power amplifier 28 may have a variable gain that can be set by a control signal received from a controller such as BSC 22 or from other base station equipment for instance. Variable gain power amplifiers are well known in the art and are therefore not described in detail here.

BSC 22 is coupled with and functions to control one or more base stations such as base station 20, so as to manage aspects of base station and air interface operation. For instance, BSC 22 may manage handoff of mobile stations moving between base station coverage areas, and to schedule air interface transmissions of data or other bearer or control traffic via base stations to or from various mobile stations. Further, BSC 22 may programmatically control the power of transmissions over the air interface, such as by directing base station 20 to increase or decrease the gain of its power amplifier or to set the gain at a specific level for instance. Depending on the wireless protocol used, aspects of the base station 20 and BSC 22 may be combined together or distributed in other ways, generally defining a base station system.

GW 26, in turn, is conventionally connected with a packet-switched network 34, such as the Internet or a wireless carrier's core transport network for instance. GW 26 may function as a network access server such as a packet data serving node (PDSN), to provide connectivity between circuit-switched communications with mobile stations and packet-switched communications on network 34. Further or alternatively, GW 26 may function as a media gateway (MGW) and may carry out functions that would otherwise be carried out by MSC 24. GW 26 may also function as a Mobile-IP (MIP) foreign agent and/or home agent for mobile stations arranged to engage in MIP communication via network 34, in a manner well known in the art.

BSC 22 and GW 26 may work together to enable suitably equipped mobile stations 14 to engage in packet-data communications on network 34. In practice, for instance, a mobile station may initially work with the RAN to establish packet-data connectivity in accordance with any agreed protocol. When a packet-data is transmitted to a mobile station, GW 26 and/or BSC 22 may receive the data as communication that triggers paging of the mobile station. GW 26 may, for instance, pass the data along to BSC 22 and instruct the BSC to page the mobile station, and BSC 22 may then direct the base station 20 to send a page message over the air interface 16 in an effort to locate the mobile station. If the mobile station is located the coverage area of the RAN and receives the page message, the mobile station may then send a page response message (e.g., a connection request message) over the air to the RAN. Thereafter, the BSC 22 may direct the base station to send to the mobile station a traffic channel assignment message that contains identifying information for a traffic channel, and the BSC may transmit the packet data via that traffic channel to the mobile station.

MSC 24, in turn, is coupled with and functions to control one or more BSCs, such as BSC 22 for instance. For instance, MSC 24 may manage handoff of mobile stations moving between BSC coverage areas, and to direct BSC 22 to take various actions such as paging particular mobile stations. In a RAN where an MSC is provided, the MSC may generally control operation of the RAN. Alternatively, the BSC (sometimes also referred to as a radio network controller (RNC)) may generally control operation of the RAN. As shown, the MSC 24 is conventionally connected with the public switched telephone network (PSTN) 30, so as to enable suitably equipped mobile stations (e.g., cellular telephones) to engage in telephone calls or other PSTN communications with entities on the PSTN.

In typical operation, when a call is placed to a mobile station, the MSC 24 would receive a communication that triggers paging of the mobile station. For instance, the MSC 24 may receive an Integrated Services Digital Network User Part (ISUP) Initial Address Message (IAM) or other communication that signifies the call and identifies the mobile station. The MSC 24 would then send a paging request to the BSC 22. In turn, the BSC would direct the base station 20 to send a page message over the air interface 16 in an effort to locate the called mobile station. If the mobile station is located the coverage area of the RAN and receives the page message, the mobile station may then send a page response message over the air to the RAN. Thereafter, the BSC 22 may direct the base station to send an acknowledgement message to the mobile station, and the BSC may then direct the base station to send to the mobile station a channel assignment message that contains identifying information for a traffic channel, and the MSC 24 may connect the call through to the mobile station.

RAN 12 also includes an SMS center (SMSC) 34, which may be configured to send SMS and/or MMS messages to mobile stations 14. SMSC 34 generally functions to store and forward SMS messages that are destined to client devices such as mobile stations 14 for instance. As such, SMSC 34 may operate in accordance with industry standard procedures to receive messages formatted under various text messaging and/or multimedia messaging formats, such as those defined by industry standards IS-41, TIA/EIA-637/IS-637, and Short Message Peer-to-Peer (SMPP) protocol for instance. The SMSC may then determine the MSC 24 that currently serves the target mobile station 14, and notify the serving MSC 24 that a message for mobile station 14 has been received. The SMSC 34 may also forward the message over a Signaling System #7 network for instance, to MSC 24 for transmission in turn to the target mobile station 14.

When the MSC 24 is notified that SMSC 34 has received a message for mobile station 14, the MSC 24 may page the mobile station 14, and if the page is acknowledged, forward the message to mobile station 14. If, however, the page fails, then MSC 24 may notify SMSC 34, which stores the message for a later attempt, at which time the process is repeated. Since the SMSC 34 may store and repeat the process of sending a message a number of times (if necessary), the MSC 24 may likewise repeat the process of paging a mobile station when the subsequent attempts to send the message occur. As a result, the PSR for SMS pages (i.e., pages originating from an SMSC), may be very high, and in practice, may be higher than for voice-service pages or other data-service pages.

In general, it should also be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Furthermore, throughout this description, the term "base station" may be used to refer to a Radio Access Network (RAN) element such as a BTS, a BSC, or combination of one or more BTSs and a BSC, for instance.

In a further aspect, RAN 12, and in particular, a base station in the RAN (e.g., BTS 20 and/or BSC 22) and/or one or more switches in the RAN (e.g., MSC 24), may be configured to at-once page a number of mobile stations in a given sector, by transmitting a General Page Message (GPM) that includes multiple pages. (Each "page" included in a GPM may also be referred to as a "page record".) In an exemplary embodiment, an MSC 24 typically receives an indication that a mobile station should be paged (e.g., for an incoming IS-2000 call), which includes an identifier of the mobile station, such as a Mobile Identification Number (MIN) or International Mobile Subscriber Identity (IMSI). The MSC 24 may then use the MIN or IMSI as a basis to determine the carrier air interface (CAI) transmit address fields, and encode these fields into a page record. The page record may then be sent to one or more base stations. Each base station may then include the page record in a GPM, which the base station transmits in its coverage area.

According to an exemplary embodiment, a base station may be configured to create a GPM that includes multiple page records, such that multiple mobile stations can be paged using a single GPM. Furthermore, page records may be concatenated so that more page records may be included in a GPM than otherwise could be. For example, in some embodiments, up to eight page records may be concatenated in a single GPM. Other embodiments may involve concatenation in which up to two page records may be concatenated in a single GPM. Other concatenation techniques are also possible.

When page records are not concatenated, each GPM typically includes only one page record, and typically occupies two 20 ms half-frames. In comparison, concatenation of two page records in a GPM may allow the GPM to be sent in two to three half frames. Such concatenation may therefore allow for at least five page records to be sent in a single 80 ms paging-channel slot. Further, some concatenation schemes allow for two to eight page records to be concatenated in a single GPM. Under such a concatenation scheme, a GPM may be sent in two to eight half frames, which in turn allows for a base station to transmit up to eight page records in a single 80 ms paging-channel slot.

When multiple page records are concatenated in a GPM, some information which is typically included in a page is not repeated for each page record. For example, length bits, overhead bits, CRC bits, and reserved bits, are not repeated for each page record in a GPM. However, there may be a performance tradeoff for increasing concatenation (which may reduce the paging channel occupancy (PCO)). Since more page records are being concatenated for transmission in the same 80 ms slot, errors in transmission may have a greater effect such that a page may fail to reach its intended mobile stations. Further, some mobile stations may not be configured to receive concatenated page records. Both of these factors (and possibly other factors as well) may cause the PSR to decrease due to concatenation.

Figure 3:
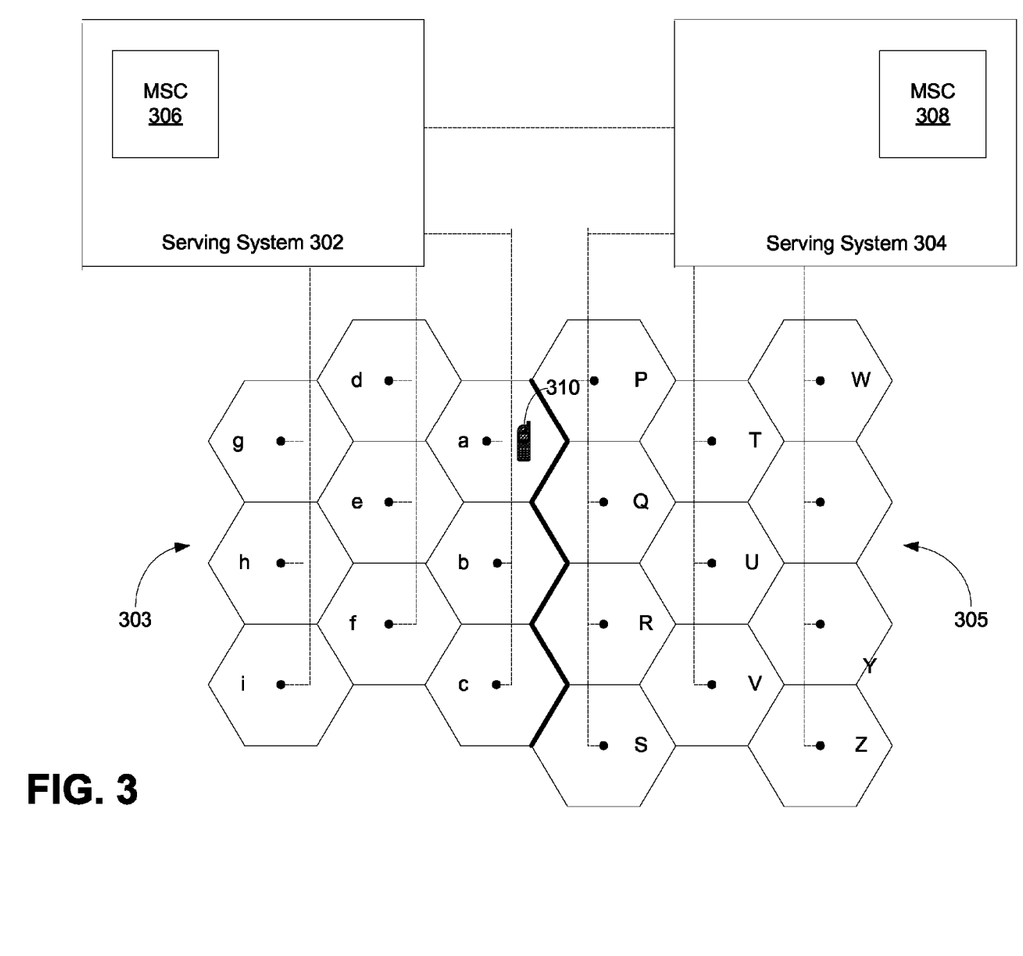
FIG. 3 is a simplified block diagram illustrating a portion of an access network configured for intersystem paging, according to an exemplary embodiment.

In a further aspect, a RAN 12 may also be configured for "intersystem paging" (which may also be referred to as "border cell paging" or "BCP"), which provides paging techniques for use when a mobile station is located at or near a border between systems in a RAN's coverage. FIG. 3 is a block diagram illustrating a portion of the coverage area in an exemplary RAN, which includes two systems 302 and 304 serving coverage areas 303 and 305, respectively. In an exemplary embodiment, each system 302 and 304 is controlled by a respective MSC 306 and 308. Each system 302 and 304 provides service in a number of sectors that are served by the respective MSC (via one or more base stations (not shown)). In particular, MSC 306 serves sectors a-i, which collectively may be referred to as coverage area 303, and MSC 308 serves sectors P-Z, which collectively may be referred to as coverage area 305. In coverage area 303, sectors a-c, which are located at the border of the paging zones, are considered to be border sectors, and collectively are considered a border zone within system 302. Similarly, in coverage area 305, sectors P-S are considered to be border sectors, and collectively are considered a border zone within system 304.

When a mobile station is located in a border zone, the serving MSC may be configured to send a page locally (i.e., in the sector or zone in which a mobile is registered), and to additionally send the page to the MSC serving the bordering system. Therefore, the mobile station can also be paged in the bordering system, which may improve service in the event that the mobile station has traveled into the coverage area of the bordering system since it last registered. Accordingly, if the mobile station responds to a page from the serving system, then call setup proceeds normally. If, on the other hand, the mobile station responds to a page from the bordering system, the call may be transferred to the bordering system.

For example, when a call arrives for a mobile station 310 registered in system 302, the serving MSC 306 may determine if the mobile station was last registered in a border zone (i.e., if the sector in which the mobile station last registered is a border sector). If the mobile station 310 is not registered in a border zone, then the MSC 306 proceeds to page the mobile station as it otherwise would (i.e., sends a page in the sector in which the mobile station is registered, and possibly neighboring sectors as well). In the illustrated scenario, however, the mobile station 310 is registered in sector a, which is in the border zone of system 302. Therefore, in addition to sending the page in sector a (and possibly nearby sectors as well), the MSC 306 sends an "intersystem" page to the MSC 308 serving the bordering system 304. MSC 308 may then send the intersystem page to mobile station 310 in its border zone, which includes sectors P-S (via the base station or base stations serving these sectors). If the mobile station 310 responds to a page from system 302, then the call proceeds normally. If, on the other hand, the mobile station 310 responds to a page from system 304, the call may be transferred to system 304.

In an exemplary embodiment, intersystem paging may be implemented using ISPAGE2 functionality, as defined by the ANSI-41 protocol (which is also referred to as IS-41). As such, intersystem pages may be relayed between systems (i.e., between MSCs) using ISPAGE2 messaging, as specified in ANSI-41. ISPAGE2 and ANSI-41 are well known in the art, and thus not described in detail herein. Further, it should be understood that the term "intersystem page", as used herein, may include any page that sent by an MSC other than the serving MSC. As such, an MSC may identify any page it receives from another MSC, or any page it sends to another MSC, as an intersystem page.

An exemplary system may be implemented in, or take the form of, a base station and/or an MSC in a RAN. As such, exemplary methods may be described in reference to a base station and/or MSC. However, it should be understood that an exemplary system may additionally or alternatively be implemented in, or take the form of, other RAN entities, or entities in communication with a RAN, without departing from the scope of the invention. As such, embodiments described in reference to a base station and/or MSC herein should be understood to apply equally in embodiments where other entities are involved. Furthermore, exemplary methods may also be described generally as being carried out by an access network (i.e.; RAN). It should be understood that when described as such, methods may be carried in whole or in part by one or more RAN entities, or entities in communication with a RAN, without departing from the scope of the invention.

Figure 4:
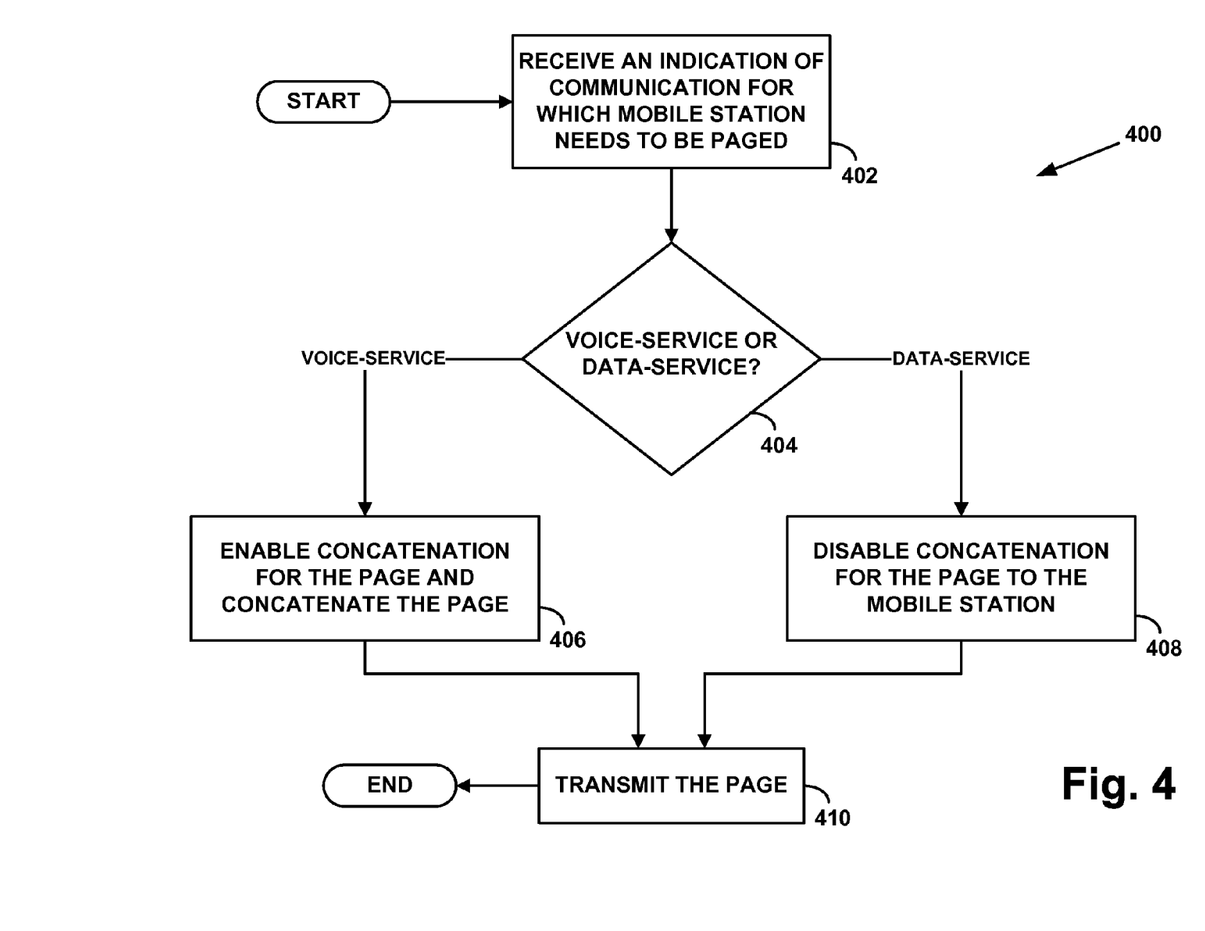
FIG. 4 is another flow chart illustrating a method for paging a mobile station, according to an exemplary embodiment.

FIG. 4 is another flow chart illustrating a method 400 for paging a mobile station, according to an exemplary embodiment. As shown, method 400 involves an access network receiving an indication of a communication for which a mobile station needs to be paged (e.g.; an incoming call, SMS, MMS, etc.), as shown by block 402. Before responsively transmitting a page to a mobile station, the access network determines whether the page is a voice-service page or a data-service page (i.e.; whether the communication involves a voice service or a data service), as shown by block 404. If the page is a voice-service page, then the access network enables concatenation and concatenates the page, as shown by block 406. If, on the other hand, the page is a data-service page, then the access network disables concatenation (and thus refrains from concatenating the page), as shown by block 408. Then, after enabling or disabling concatenation as appropriate (and concatenating the page if concatenation is enabled), the access network transmits the page, as shown by block 410.

The access network may determine whether a given page is a voice-service page or a data-service page using various techniques. For example, an exemplary GPM may have a number of parameters, including a SERVICE_OPTION (SO) parameter indicates the type of service for which the mobile station is being paged. Thus, a base station may determine the page-type from a page record it receives, and in particular, from the SERVICE_OPTION parameter of the page record. In an exemplary embodiment, this may involve classifying the page as either a voice-service page or a data-service page. For example, the following table shows various Service Options that are defined under IS-95 and/or IS-2000.

| Service Option | Service |
| --- | --- |
| SO1 | Basic Variable Rate Voice Service (8 kbps) |
| SO2 | Mobile Station Loopback (8 kbps) |
| SO3 | Enhanced Variable Rate Codec (EVRC) Voice Service (8 kbps) |
| SO6 | Short Message Services (Rate Set 1) |
| SO9 | Mobile Station Loopback (13 kbps) |
| SO14 | Short Message Services (Rate Set 2) |
| SO17 | High Rate Voice Service (13 kbps) |
| SO32 | Test Data Service Option (TDSO) |
| SO33 | cdma2000 High Speed Packet Data Service, Internet or ISO Protocol Stack |
| SO55 | Loopback Service Option (LSO) |
| SO68 | EVRC-B Voice Service (8 kbps) |
| SO70 | EVRC-WB Voice Service (8 kbps) |
| SO32768 | Proprietary Service Option (Qualcomm Inc.) |

Accordingly to an exemplary embodiment, the following may be classified as voice-service pages: SO1 (Basic Variable Rate Voice Service (8 kbps)), SO3 (Enhanced Variable Rate Codec (EVRC) Voice Service (8 kbps)), SO17 (High Rate Voice Service (13 kbps)), SO68 (EVRC-B Voice Service (8 kbps)), SO70 (EVRC-WB Voice Service (8 kbps)), and SO32768 (Proprietary Service Option for Qualcomm Inc.). Further, pages classified as data-service pages may include: SO2 (Mobile Station Loopback (8 kbps)), SO9 (Mobile Station Loopback (13 kbps)), SO55 (Loopback Service Option (LSO)), SO32 (Test Data Service Option (TDSO)), and SO33 (CDMA2000 High Speed Packet Data Service, Internet or ISO Protocol Stack).

Yet further, SO6 (Short Message Services (Rate Set 1)) and SO14 (Short Message Services (Rate Set 2)) may be classified as SMS pages. As noted, SMS pages may be treated as voice-service pages, data-service pages, or as their own distinct page-type. Accordingly, in an exemplary embodiment, SO6 and SO14 may be treated in any such manner.

Further, while a page may an exemplary embodiment may take the form of a page record in a GPM, and identify the type of communication using the SERVICE_OPTION parameter, it should be understood that a page may take any form, and identify the type of communication in any manner, without departing from the scope of the invention.

As another example, when the MSC receives an incoming communication that requires that it page a mobile station, the communication typically includes or is accompanied by messaging that provides the same information included in a GPM. This information will generally including in an indication of the type of service that the communication involves. The MSC may then relay this information to the serving MSC using signaling links that are internal to the RAN. While the format in which the MSC receives the information, and the format in which the MSC relays this information to the BSC, are typically proprietary (i.e., specific to the vendor of the MSC), the information is generally the same as that included in a GPM, and thus may be used by the MSC and/or BSC to identify the page-type of a given page.

Figure 5:
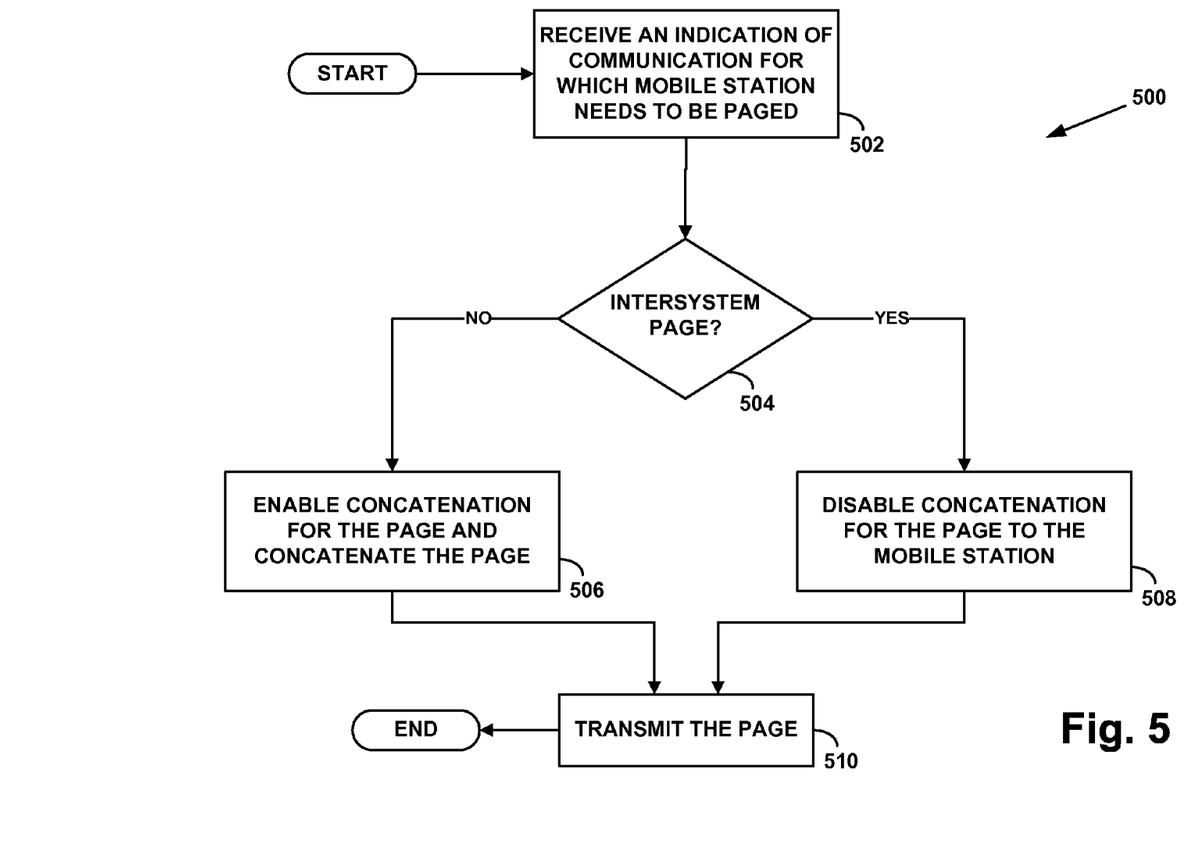
FIG. 5 is another flow chart illustrating a method for paging a mobile station, according to an exemplary embodiment.

FIG. 5 is another flow chart illustrating a method 500 for paging a mobile station, according to an exemplary embodiment. As shown, method 500 again involves an access network receiving an indication of a communication for which a mobile station needs to be paged, as shown by block 502. Before transmitting a page to a mobile station, the access network determines whether or not the page is an intersystem page, as shown by block 504. If the page is not an intersystem page, then the access network enables concatenation and concatenates the page, as shown by block 506. If, on the other hand, the page is an intersystem page, then the access network disables concatenation (and thus refrains from concatenating the page), as shown by block 508. Then, after enabling or disabling concatenation as appropriate (and concatenating the page if concatenation is enabled), the access network transmits the page, as shown by block 510.

The access network may determine whether or not a given page is an intersystem page using various techniques. For example, and MSC may deem any page forwarded to it by another MSC to be an intersystem page. Further, to notify a base station whether or not a page is an intersystem page, an exemplary MSC may be configured to include an intersystem indicator as part of, or in conjunction with the transmission of a page record. For instance, the MSC may include an intersystem bit in the page record, which is set to "1" if the page record was forwarded to the MSC from another MSC (e.g., if the MSC did not itself create the page record), and set to "0" if the MSC itself created the page record. As such, when a base station receives a page record, it may check the intersystem indicator as a basis for determining the page-type. However, it should be understood that an access network may identify a page as an intersystem page using any technique, without departing from the scope of the invention.

Figure 6:
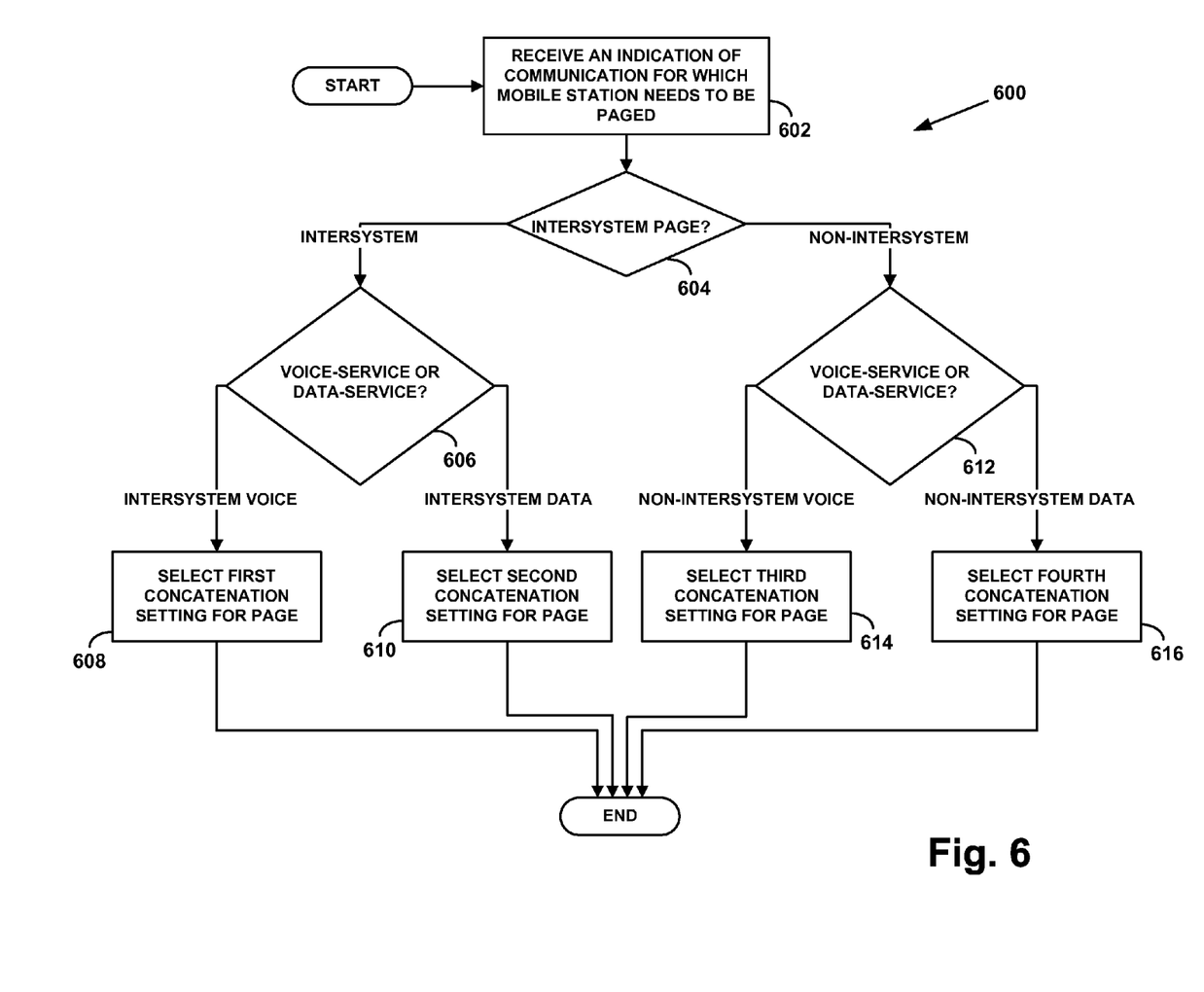
FIG. 6 is another flow chart illustrating a method for paging a mobile station, according to an exemplary embodiment.

FIG. 6 is another flow chart illustrating a method 600 for paging a mobile station, according to an exemplary embodiment. As shown, method 600 again involves an access network receiving an indication of a communication for which a mobile station needs to be paged, as shown by block 602. Before transmitting a page to a mobile station, the access network determines whether or not the page is an intersystem page, as shown by block 604. If the page is an intersystem page, then the access network determines whether the page is an intersystem voice-service page or an intersystem data-service page, as shown by block 606. If the page is an intersystem voice-service page, then the access network selects a first concatenation setting for the page, as shown by block 608. If, on the other hand, the page is an intersystem data-service page, then the access network selects a second concatenation setting for the page, as shown by block 610. If the page is not an intersystem page, the system will likewise determine whether the page is a voice-service page or a data-service page, as shown by block 612. If the page is a (non-intersystem) voice-service page, then the access network selects a third concatenation setting for the page, as shown by block 614. If the page is a (non-intersystem) data-service page, then the access network selects a fourth concatenation setting for the page, as shown by block 616.

It should be understood that the order in which the access network checks whether a given page is an intersystem page and checks whether the page is a voice-service or data service page is interchangeable. Furthermore, the concatenation settings for some of the page-types may be the same; e.g., concatenation may be disabled in more than one of the four concatenation settings. In an exemplary embodiment, both the first and second concatenation settings preferably disable concatenation, such that concatenation is disabled for all intersystem pages. Further, in an exemplary embodiment, the third concatenation setting preferably enables concatenation for non-intersystem voice-service pages, while the fourth concatenation setting preferably disables concatenation for non-intersystem data-service pages.

Figure 7:
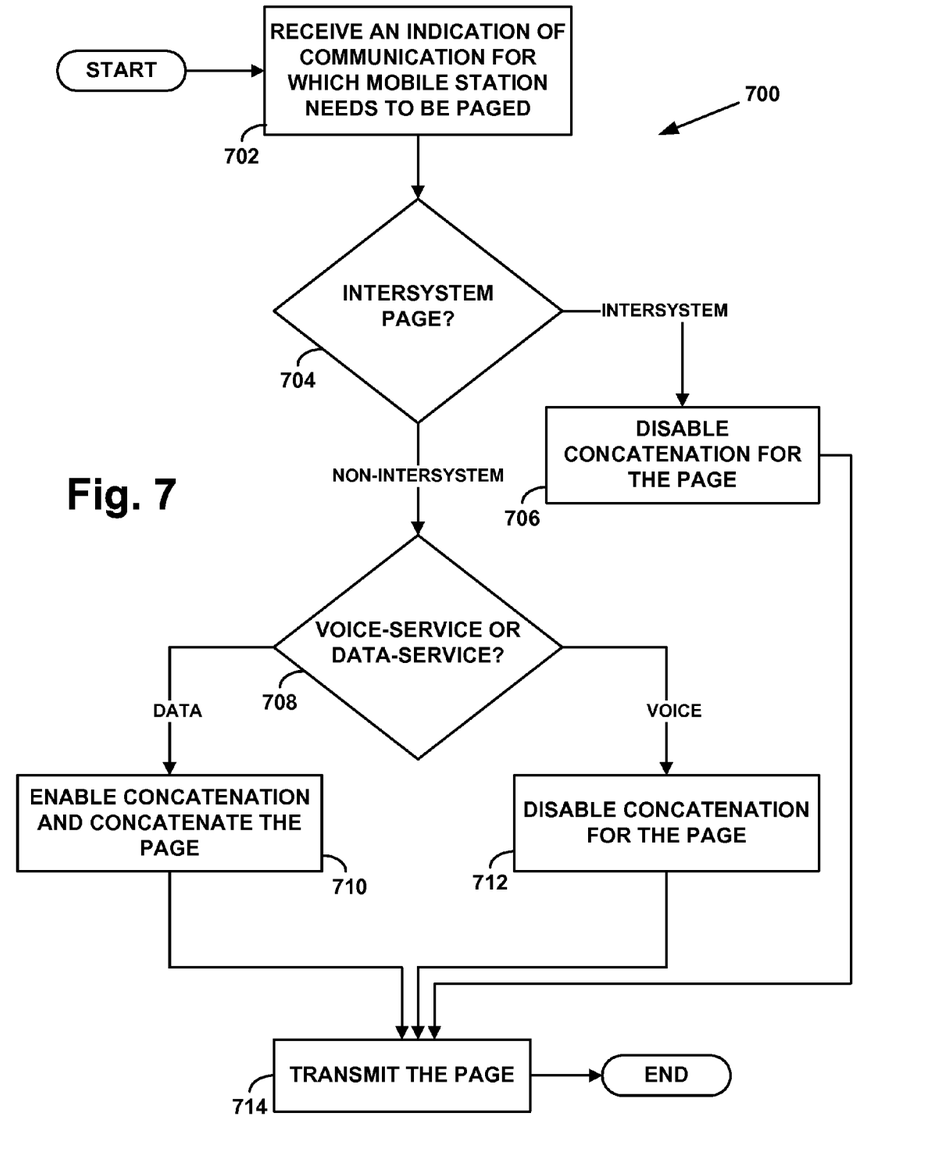
FIG. 7 is another flow chart illustrating a method for paging a mobile station, according to an exemplary embodiment.

FIG. 7 is another flow chart illustrating a method 700 for paging a mobile station, according to an exemplary embodiment. In particular, method 700 is an embodiment of the method shown in FIG. 6, in which intersystem paging is prioritized. In other words, concatenation is disabled for all intersystem pages.

As shown method 700 again involves an access network receiving an indication of a communication for which a mobile station needs to be paged, as shown by block 702. Before transmitting a page to a mobile station, the access network determines whether or not the page is an intersystem page, as shown by block 704. If the page is an intersystem page, then the access network disables concatenation (and thus refrains from concatenating the page), as shown by block 706. If, on the other hand, the page is not an intersystem page, then the access network determines whether the page is a voice-service page or a data-service page, as shown by block 708. If the page is a non-intersystem voice-service page, then the access network enables concatenation and concatenates the page, as shown by block 710. Otherwise, if the page is a non-intersystem data-service page, then the access network disables concatenation (and thus refrains from concatenating the page), as shown by block 712. Then, after enabling or disabling concatenation as appropriate (and concatenating the page if concatenation is enabled), the access network transmits the page, as shown by block 714.

In a further aspect, an exemplary method may further differentiate SMS-service pages from voice-service and data-service pages, for purposes of enabling/disabling concatenation. For example, since SMS-service pages typically have a high PSR, concatenation may be enabled for SMS-service pages. It is further possible that an exemplary method may differentiate between intersystem SMS-service pages and non-intersystem SMS-service pages (e.g., disabling concatenation for intersystem SMS-service pages). However, while possible, concatenation is preferably enabled for all SMS-service pages, due to the high PSR for such pages.

In a further aspect, since pages may be grouped in a GPM that has a given transmission power, an exemplary base station and/or MSC may group pages such that a given GPM includes only page records for which the same concatenation setting has been selected. As such, exemplary methods may further involve the access network, after it is determined the page-type of a page record, grouping the page record with other page records of the same page-type for transmission in a GPM (in which concatenation may be accordingly enabled or disabled). The grouping of pages into page-type groups for transmission in GPMs may therefore be implemented as part of an exemplary method, including, but not limited to, the exemplary methods illustrated in FIGS. 4-7.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method for paging a mobile station, the method comprising:
  before transmission of a page to a mobile station by an access network, the access network:
    (a) determining a page-type of the page to the mobile station;
    (b) based at least in part on the page-type, determining whether to disable or enable page-concatenation for the page; and
    (c) if concatenation is enabled, then concatenating the page, and otherwise refraining from concatenating the page; and
  the access network transmitting the page to the mobile station.

2. The method of claim 1, wherein determining the page-type of the page comprises determining whether the page is a voice-service page or a data-service page.

3. The method of claim 2, wherein concatenation is enabled if the page is a voice-service page.

4. The method of claim 2, wherein concatenation is disabled if the page is a data-service page.

5. The method of claim 1, wherein determining the page-type of the page comprises determining whether or not the page is an intersystem page.

6. The method of claim 5, wherein concatenation is disabled if the page is an intersystem page.

7. The method of claim 1, wherein determining the page-type of the page comprises determining whether the page is (a) an intersystem voice-service page, (b) a non-intersystem voice-service page, (c) an intersystem data-service page, or (d) a non-intersystem data-service page.

8. The method of claim 7, wherein:
  concatenation is enabled if the page is a non-intersystem voice-service page; and
  concatenation is disabled if the page is an intersystem voice-service page, an intersystem data-service page, or a non-intersystem data-service page.

9. The method of claim 1, further comprising, when concatenation is enabled, selecting a page-concatenation level for the page to the mobile station from plurality of available page-concatenation levels, wherein each available page-concatenation level corresponds to different amount of concatenation.

10. The method of claim 1, wherein determining the page-type of the page comprises determining whether the page is a voice-service page, a data-service page, or an SMS-service page.

11. The method of claim 10, wherein determining the page-type of the page further comprises determining whether the page is an intersystem page or a non-intersystem page.

12. A system comprising:
  a tangible computer readable medium; and
  program instructions stored on the tangible computer readable medium and executable by at least one processor to:
    (i) before transmission of a page to a mobile station by an access network:
      (a) determine a page-type of the page to the mobile station;
      (b) based at least in part on the page-type, determine whether to disable or enable page-concatenation for the page; and (c) if concatenation is enabled, then cause the access network to concatenate the page, and otherwise cause the access network to refrain from concatenating the page; and
(ii) cause the access network to transmit the page to the mobile station.

13. The system of claim 12, wherein the program instructions stored on the tangible computer readable medium and executable by at least one processor to determine the page-type of the page comprise:
program instructions stored on the tangible computer readable medium and executable by at least one processor to determine whether the page is a voice-service page or data-service page.

14. The system of claim 13, wherein concatenation is enabled if the page is a voice-service page.

15. The system of claim 13, wherein concatenation is disabled if the page is a data-service page.

16. The system of claim 12, wherein the program instructions stored on the tangible computer readable medium and executable by at least one processor to determine the page-type of the page comprise:
program instructions stored on the tangible computer readable medium and executable by at least one processor to determine whether or not the page is an intersystem page.

17. The system of claim 16, wherein concatenation is disabled if the page is an intersystem page.

18. The system of claim 12, wherein the program instructions stored on the tangible computer readable medium and executable by at least one processor to determine the page-type of the page comprise:
program instructions stored on the tangible computer readable medium and executable by at least one processor to determine whether the page is (a) an intersystem voice-service page, (b) a non-intersystem voice-service page, (c) an intersystem data-service page, or (d) a non-intersystem data-service page.

19. The system of claim 18, wherein:
concatenation is enabled if the page is a non-intersystem voice-service page; and
concatenation is disabled if the page is an intersystem voice-service page, an intersystem data-service page, or a non-intersystem data-service page.

20. The system of claim 10, further comprising program instructions stored on the tangible computer readable medium and executable by at least one processor to, when concatenation is enabled, select a page-concatenation level for the page to the mobile station from plurality of available page-concatenation levels, wherein each available page-concatenation level corresponds to different amount of concatenation.

21. The system of claim 12, wherein the program instructions stored on the tangible computer readable medium and executable by at least one processor to determine the page-type of the page comprise:
program instructions stored on the tangible computer readable medium and executable by at least one processor to determine whether the page is a voice-service page, a data-service page, or an SMS-service page.

22. The system of claim 21, wherein the program instructions stored on the tangible computer readable medium and executable by at least one processor to determine the page-type of the page further comprise:
program instructions stored on the tangible computer readable medium and executable by at least one processor to determine whether the page is an intersystem page or a non-intersystem page.

* * * * *